United States Patent
Lee et al.

(10) Patent No.: US 10,305,975 B2
(45) Date of Patent: May 28, 2019

(54) WIRELESS NETWORK CLOUD COMPUTING RESOURCE MANAGEMENT

(71) Applicant: Atlassian, Inc., San Francisco, CA (US)

(72) Inventors: Jay J. Lee, San Ramon, CA (US); Patricia R. Chang, San Ramon, CA (US); David Chiang, Fremont, CA (US); Deepak Kakadia, Union City, CA (US); Vikram K. Rawat, San Ramon, CA (US)

(73) Assignee: Atlassian, Inc., San Francisco, CA (US)

(*) Notice: Subject to any disclaimer, the term of this patent is extended or adjusted under 35 U.S.C. 154(b) by 0 days.

(21) Appl. No.: 15/286,184

(22) Filed: Oct. 5, 2016

(65) Prior Publication Data

US 2017/0026463 A1    Jan. 26, 2017

Related U.S. Application Data

(63) Continuation of application No. 12/983,672, filed on Jan. 3, 2011, now Pat. No. 9,467,507.

(51) Int. Cl.
*H04L 29/08* (2006.01)
*G06F 9/50* (2006.01)
*H04L 12/911* (2013.01)

(52) U.S. Cl.
CPC ........ *H04L 67/1008* (2013.01); *G06F 9/5044* (2013.01); *G06F 9/5055* (2013.01); *H04L 47/783* (2013.01); *H04L 67/101* (2013.01); *H04L 67/1012* (2013.01); *G06F 2209/5021* (2013.01)

(58) Field of Classification Search
CPC ... H04L 47/783; H04L 67/10; H04L 67/1002; H04L 67/1004; H04L 67/1008; H04L 67/101; H04L 67/1012; G06F 9/5005; G06F 9/5044; G06F 9/505; G06F 9/5055
See application file for complete search history.

(56) References Cited

U.S. PATENT DOCUMENTS

| | | | |
|---|---|---|---|
| 6,401,238 B1* | 6/2002 | Brown | G06F 8/61 709/224 |
| 6,579,324 B1 | 6/2003 | Lowry et al. | |
| 7,200,678 B1* | 4/2007 | Bettadahalli | H04L 61/2015 370/401 |
| 7,519,916 B1* | 4/2009 | Hartwell | H04L 47/10 715/771 |

(Continued)

*Primary Examiner* — Khang Do
(74) *Attorney, Agent, or Firm* — Hickman Palermo Becker Bingham LLP

(57) ABSTRACT

A method, performed by a server device, may include receiving a request to activate an application session, the request being received from a user equipment on behalf of a particular application installed on the user equipment. The method may further include determining one or more application requirements associated with the particular application; determining conditions associated with one or more application servers; selecting a particular one of the one or more application servers based on the determined one or more application requirements and based on the determined conditions; and setting up the application session between the user equipment and between the selected particular one of the one or more application servers.

9 Claims, 9 Drawing Sheets

(56) References Cited

U.S. PATENT DOCUMENTS

| | | | |
|---|---|---|---|
| 7,886,023 B1 | 2/2011 | Johnson | |
| 8,075,403 B2* | 12/2011 | O'Brien | H04L 67/10 |
| | | | 345/440 |
| 8,234,650 B1 | 7/2012 | Eppstein et al. | |
| 8,972,519 B2* | 3/2015 | Attanasio | G06F 9/5055 |
| | | | 709/217 |
| 2003/0229697 A1* | 12/2003 | Borella | H04L 29/06 |
| | | | 709/226 |
| 2004/0064552 A1* | 4/2004 | Chong | G06F 11/3006 |
| | | | 709/224 |
| 2005/0066331 A1 | 3/2005 | Inoue et al. | |
| 2005/0267895 A1 | 12/2005 | Yoshiuchi et al. | |
| 2006/0109785 A1 | 5/2006 | Chandwadkar et al. | |
| 2007/0157234 A1 | 7/2007 | Walker | |
| 2009/0204711 A1* | 8/2009 | Binyamin | H04L 67/16 |
| | | | 709/226 |
| 2010/0094967 A1* | 4/2010 | Zuckerman | H04L 67/1097 |
| | | | 709/219 |
| 2011/0252082 A1 | 10/2011 | Cobb et al. | |
| 2012/0059937 A1* | 3/2012 | Dheap | H04L 47/10 |
| | | | 709/226 |
| 2012/0060157 A1 | 3/2012 | Sekine et al. | |
| 2012/0089726 A1 | 4/2012 | Doddavula | |
| 2012/0158819 A1* | 6/2012 | Anderson | G06F 8/60 |
| | | | 709/202 |

* cited by examiner

WIRELESS NETWORK CLOUD COMPUTING RESOURCE MANAGEMENT

CROSS REFERENCE TO RELATED APPLICATIONS

This application is a continuation of U.S. patent application Ser. No. 12/983,672 filed on Jan. 3, 2011, the contents of which are hereby incorporated herein by reference in their entirety.

BACKGROUND INFORMATION

A user may connect to a wireless communication network using user equipment (UE) and perform various functions. For example, the user may place telephone calls via the UE across the wireless communication network. The user may also access various data resources available via the wireless communication network. For example, the user may stream real time data by accessing an Internet radio station, access an online account associated with a particular service, download a document, etc. A user may access a particular data resource by activating an application on the UE and the UE may use network resources to perform processing associated with the application. When the application on the UE uses network resources to perform computations, such processing may be referred to as cloud computing. Management of cloud computing resources may prove to be a challenging task.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may relate to management of cloud computing resources in a wireless network. A UE may include one or more applications installed on the UE. When a particular application installed on the UE becomes activated, the particular application may use cloud computing by accessing an application server via a wireless network. A resource information server may receive a request from the particular application to activate an application session and may select a particular application server from multiple application servers to perform cloud computing for the application session. The resource information server may select the particular application server based on application requirements associated with the particular application and based on conditions associated with the application servers.

In one example, the resource information server may store the application requirements. Additionally or alternatively, the UE may provide at least some of the application requirements to the resource information server along with the request for the application session. Additionally or alternatively, the resource information server may provide information about the conditions associated with the application servers to the UE and the UE may tailor the request for the application session based on the information about the conditions associated with the application servers by, for example, selecting a particular application mode. Thus, an application may be selected to run in a particular mode based on the computing resources that are available on the network.

Figure 1:
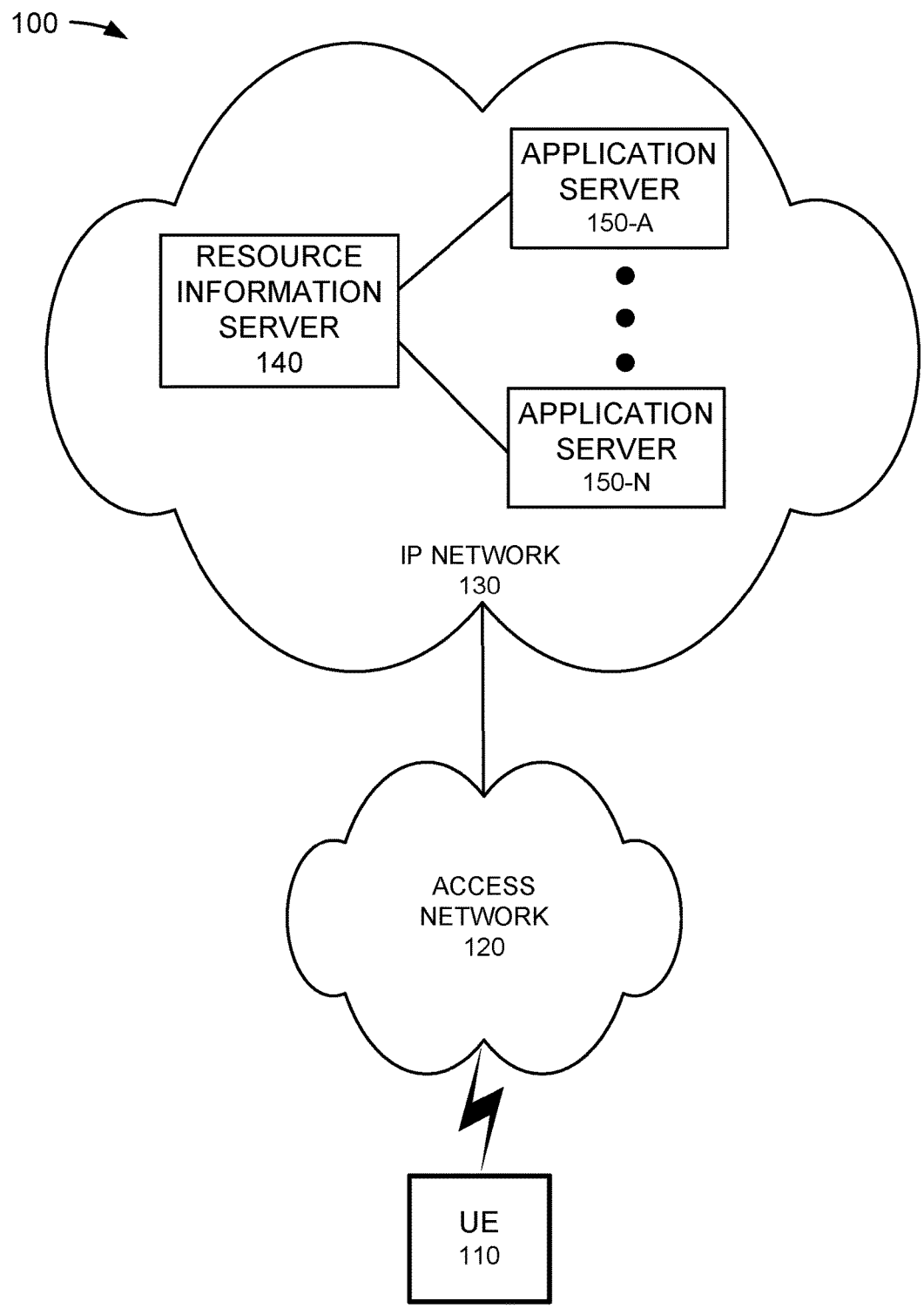
FIG. 1 is a diagram illustrating an example of components of a system according to an implementation described herein.

FIG. 1 is a diagram of a system 100 according to an implementation described herein. As shown in FIG. 1, system 100 may include a UE 110, an access network 120, and an Internet Protocol (IP) network 130.

UE 110 may include any wireless communication device that a user may use to connect to IP network 130 via access network 120. UE 110 may include, for example, a mobile communication device, such as a mobile phone, a smart phone, a personal digital assistant (PDA), or a media playing device with communication capabilities; a desktop device, such as a personal computer or a workstation; a laptop computer; a telephone terminal; or any other communication device or combinations thereof.

Access network 120 may include an access network that provides IP connectivity between UE 110 and IP network 130. Access network 120 may include a base station (not shown in FIG. 1) that allows UE 110 to connect to access network 120 via a wireless connection. Access network 120 may include an access network based on a CDMA2000 standard (e.g., a CDMA one times radio transmission technology (1×RTT) network, a CDMA HRPD network, a CDMA HRPD network (which may include a CDMA evolution optimized data only (EV-DO) network), or a CDMA eHRPD network); an access network based on a GSM standard (e.g., a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network); or a Long Term Evolution (LTE) network as specified by the $3^{rd}$ Generation Partnership Project (3GPP).

IP network 130 may include circuit-switched network and/or a packet-switched network, such as, for example, a local area network (LAN), a wide area network (WAN), a metropolitan area network (MAN), an optical network, a cable television network, a satellite television network, an evolved packet core (EPC) network as specified by 3GPP, a telephone network (e.g., the Public Switched Telephone Network (PSTN) or a cellular network), an intranet, the Internet, or a combination of networks.

IP network 130 may include a resource information server 140 and one or more application servers 150-A to 150-N (referred to herein collectively as "application servers 150" and individually as "application server 150"). Resource information server 140 may include one or more devices (e.g., server devices) that receive a session activation request for a particular application from UE 110, may determine application requirements associated with the particular application, may determine conditions associated with application servers 150, may select a particular application server 150 based on the determined application requirements and application server conditions, and may set up an application session between UE 110 and the selected application server 150.

Application server 150 may include one or more devices that perform cloud computing for an application running on UE 110. Cloud computing may refer to any processing performed on behalf of an application running on UE 110 by application server 150.

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100.

Figure 2:
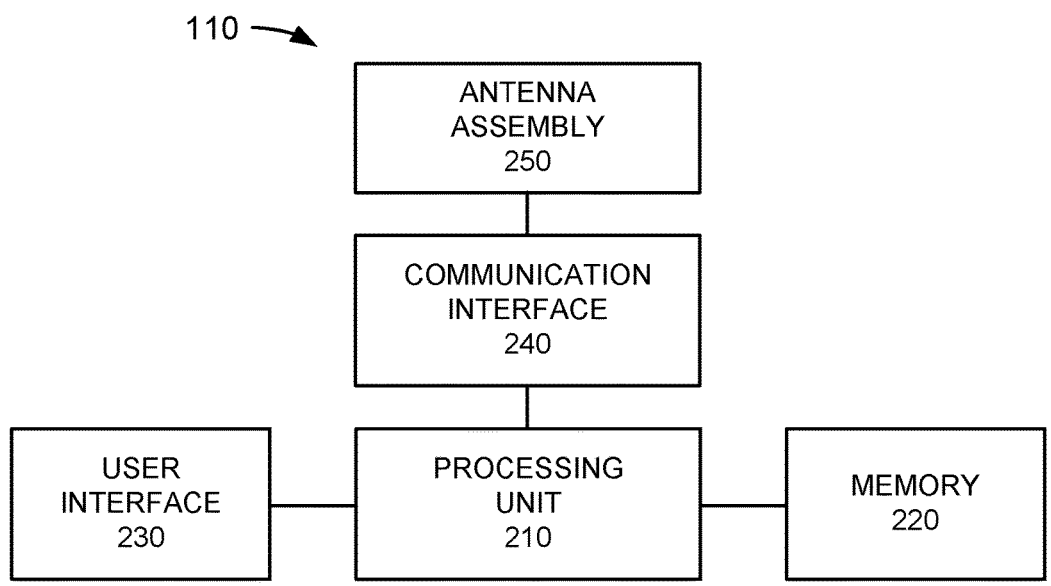
FIG. 2 is a diagram illustrating example components of a user equipment according to an implementation described herein.

FIG. 2 is a diagram illustrating example components of UE 110 according to an implementation described herein. As shown in FIG. 2, UE 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), or the like. Processing unit 210 may control operation of UE 110 and its components.

Memory 220 may include a random access memory (RAM), a read only memory (ROM), and/or another type of memory to store data and instructions that may be used by processing unit 210.

User interface 230 may include mechanisms for inputting information to UE 110 and/or for outputting information from UE 110. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, or keys of a keypad) to permit data and control commands to be input into UE 110; a display to output visual information; and/or a vibrator to cause UE 110 to vibrate.

Communication interface 240 may include any transceiver-like mechanism that enables UE 110 to communicate with other devices and/or systems. For example, communication interface 240 may include a modem or an Ethernet interface to a LAN. Communication interface 240 may also include mechanisms for communicating via a wireless network, such as access network 120. For example, communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air and receive RF signals over the air and provide them to communication interface 240.

As described herein, UE 110 may perform certain operations in response to processing unit 210 executing software instructions contained in a computer-readable medium, such as memory 220. A computer-readable medium may be defined as a non-transitory memory device. A memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of UE 110, in other implementations, UE 110 may include fewer components, different components, differently arranged components, or additional components than depicted in FIG. 2. Additionally or alternatively, one or more components of UE 110 may perform the tasks described as being performed by one or more other components of UE 110.

Figure 3:
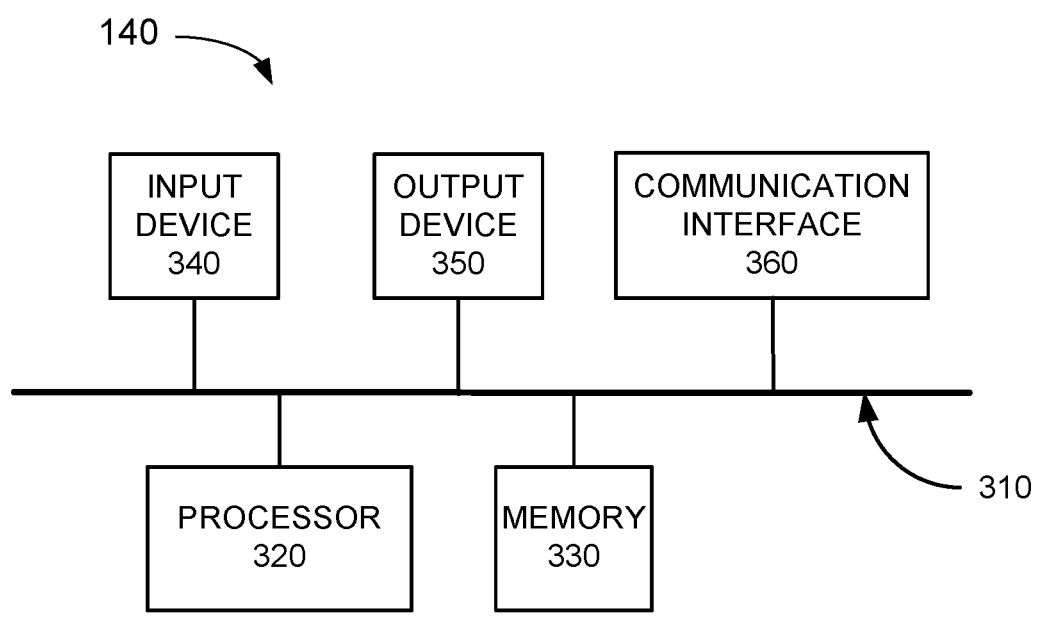
FIG. 3 is a diagram illustrating example components of a resource information server according to an implementation described herein.

FIG. 3 is a diagram illustrating example components of resource information server 140 according to a first implementation described herein. As shown in FIG. 3, resource information server 140 may include a bus 310, a processor 320, a memory 330, an input device 340, an output device 350, and a communication interface 360.

Bus 310 may include a path that permits communication among the components of resource information server 140. Processor 320 may include one or more processors, microprocessors, or processing logic (e.g., ASICs or FPGAs) that may interpret and execute instructions. Memory 330 may include a RAM device or another type of dynamic storage device that may store information and instructions for execution by processor 320, a ROM device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to resource information server 140, such as a keypad, a keyboard, a button, or an input jack for an input device such as a keypad or a keyboard, etc. Output device 350 may include a mechanism that outputs information to the operator, including one or more light indicators, a display, a speaker, etc.

Communication interface 360 may include any transceiver-like mechanism that enables resource information server 140 to communicate with other devices and/or systems. For example, communication interface 360 may include a modem, a network interface card, and/or a wireless interface card.

As will be described in detail below, resource information server 140 may perform certain operations. Resource information server 140 may perform these operations in response to processor 320 executing software instructions stored in a computer-readable medium, such as memory 330.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of resource information server 140, in other implementations, resource information server 140 may include fewer components, different components, additional components, or differently arranged components than depicted in FIG. 3. Additionally or alternatively, one or more components of resource information server 140 may perform one or more tasks described as being performed by one or more other components of resource information server 140.

Figure 4:
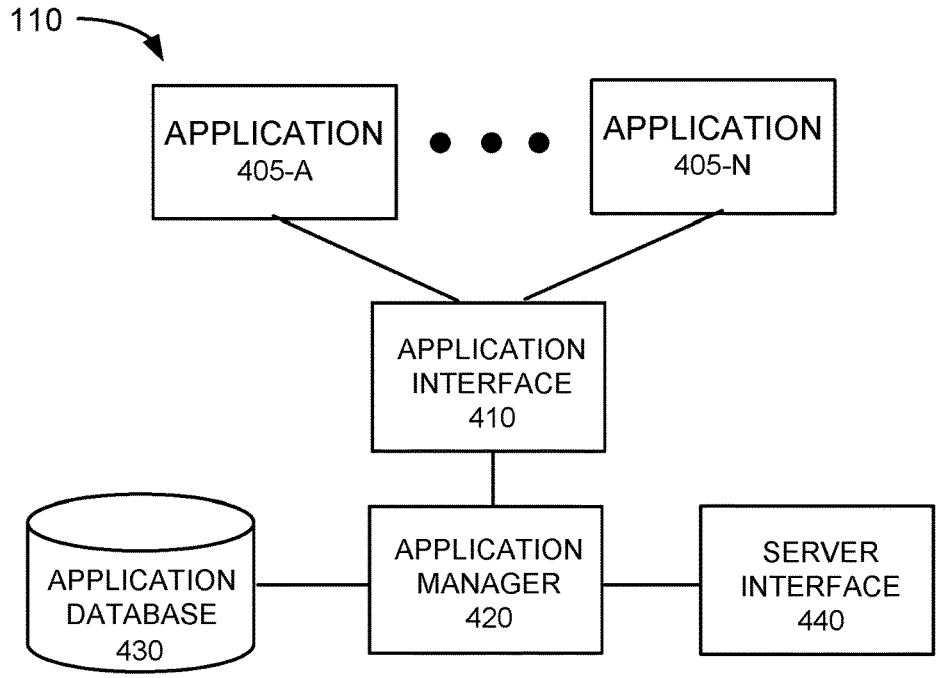
FIG. 4 is a diagram of example functional components of a user equipment according to an implementation described herein.

FIG. 4 is a diagram of example functional components of UE 110 according to an implementation described herein. As shown in FIG. 4, UE 110 may include one or more applications 405-A to 405-N (referred to herein collectively as "applications 405" and individually as "application 405"), an application interface 410, an application manager 420, an application database 430, and a server interface 440.

Application 405 may include any application installed on UE 110 that may rely, at least in part and at least at times, on cloud computing to perform processing tasks. For example, application 405 may include any executable program that may be activated by a user of UE 110 or that may be activated automatically by UE 110 in response to detecting a particular condition associated with UE 110, associated with access network 120, or associated with IP network 130.

Application interface 410 may communicate with applications 405 installed on UE 110. For example, application interface 410 may detect when application 405 has been activated, may intercept a session initiation request sent by application 405 to communication interface 240 and may forward the request to application manager 420. Application interface 410 may also receive messages from resource information server 140 and/or application server 150 via application manager 410, may format the intercepted messages into a format compatible with application 405, and may forward the formatted messages to the particular application. Once an application session has been activated, application interface 410 may relay messages between application 405 and resource information server 140.

Application manager 420 may manage application sessions. For example, application manager 420 may receive an indication from application interface 410 that application 405 has been activated, may, in response to receiving the indication, generate a session activation request for application 405, and may forward the session activation request, via server interface 440, to resource information server 140. Additionally or alternatively, based on detecting that application 405 has been activated, application manager 420 may instruct application 405 to communicate with resource information server 140, rather than communicating with application server 150. In one example, application manager 420 may generate a session activation request for application 405 to resource information server 140 without providing information about requirements associated with application 405. In another example, application manager 420 may access application database 430, and/or query application 405, to determine requirements associated with application 405. Application manager 420 may forward the determined application requirements to resource information server 140. In yet another example, application manager 420 may receive, from resource information server 140, information about conditions associated with application servers 150. Application manager 420 may communicate with application 405 to tailor a session activation request based on the received information about the conditions associated with application servers 150. For example, application manager 420 may select a mode for application 405, from different available modes, based on the received information about the conditions associated with application servers 150. Application manager 420 may measure parameters associated with application 405 during an application session and may store the measured parameters as application requirements in application database 430.

Application database 430 may store information associated with applications 405. Example fields that may be stored in application database 430 are described below with reference to FIG. 6A.

Server interface 440 may communicate with resource information server 140 and/or with application servers 150. For example, server interface 440 may receive a message from application manager 420 for resource information server 140 and/or for application server 150, may transform the message into a format compatible with resource information server 140 and/or with application server 150, and may forward the transformed message to resource information server 140 and/or to application server 150. Server interface 140 may also receive a message from resource information server 140 and/or from application server 150 and may forward the message to application manager 420.

Although FIG. 4 shows example functional components of UE 110, in other implementations, UE 110 may include fewer functional components, different functional components, differently arranged functional components, or additional functional components than depicted in FIG. 4. Additionally or alternatively, one or more functional components of UE 110 may perform one or more tasks described as being performed by one or more other functional components of UE 110.

Figure 5:
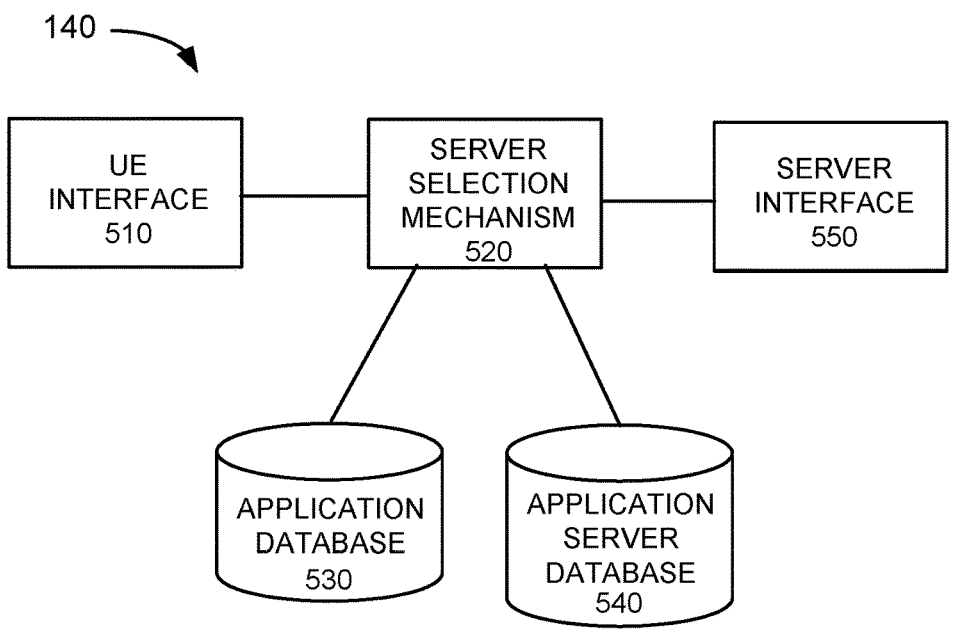
FIG. 5 is a diagram of example functional components of a resource information server according to an implementation described herein.

FIG. 5 is a diagram of example functional components of resource information server 140 according to an implementation described herein. As shown in FIG. 5, resource information server 140 may include a UE interface 510, a server selection mechanism 520, an application database 530, an application server database 540, and a server interface 550.

UE interface 510 may communicate with UE 110. For example, UE interface 510 may receive a request from UE 110 to set up an application session for a particular application, or data associated with the particular application, and may forward the received message to server selection mechanism 520 and/or to application server 150. UE interface 510 may also receive data from application server 150 for the particular application, may transform the data to a format compatible with UE 110, and may transmit the data to UE 110 via access network 120.

Server selection mechanism 520 may select one or more particular application servers 150 for a particular application session. For example, server selection mechanism 520 may receive a request for an application session from a particular application 405, may determine application requirements associated with application 405, may determine conditions associated with application servers 150, and may select one or more application servers 150 by matching the determined application requirements with the determined application server conditions. In one example, server selection mechanism 520 may determine application requirements associated with application 405 by accessing application database 530. Additionally or alternatively, server selection mechanism 520 may receive application requirements associated with application 405 from UE 110. In one example, server selection mechanism 520 may determine conditions associated with application servers 150 by accessing application server database 540. Additionally or alternatively, server selection mechanism 520 may determine conditions associated with application servers 150 by querying application servers 150. Server selection mechanism 520 may measure parameters associated with application 405 during an application session and may store the measured parameters as application requirements in application database 530.

Application database 530 may store information associated with applications 405. Example fields that may be stored in application database 530 are described below with reference to FIG. 6A.

Application server database 540 may store information associated with application servers 150. Example fields that may be stored in application server database 540 are described below with reference to FIG. 6B.

Server interface 550 may communicate with application servers 150. For example, server interface 550 may query application servers 150 for conditions associated with application servers 150 and may receive information from application servers 150 about the queried conditions. Server interface 550 may also inform a particular application server 150 that the particular application server 150 has been selected for an application session for application 405 and may forward information to application server 150 about the application session.

Although FIG. 5 shows example functional components of resource information server 140, in other implementations, resource information server 140 may include fewer functional components, different functional components, differently arranged functional components, or additional functional components than depicted in FIG. 5. Additionally or alternatively, one or more functional components of resource information server 140 may perform one or more tasks described as being performed by one or more other functional components of resource information server 140.

Figures 6A, 6B:
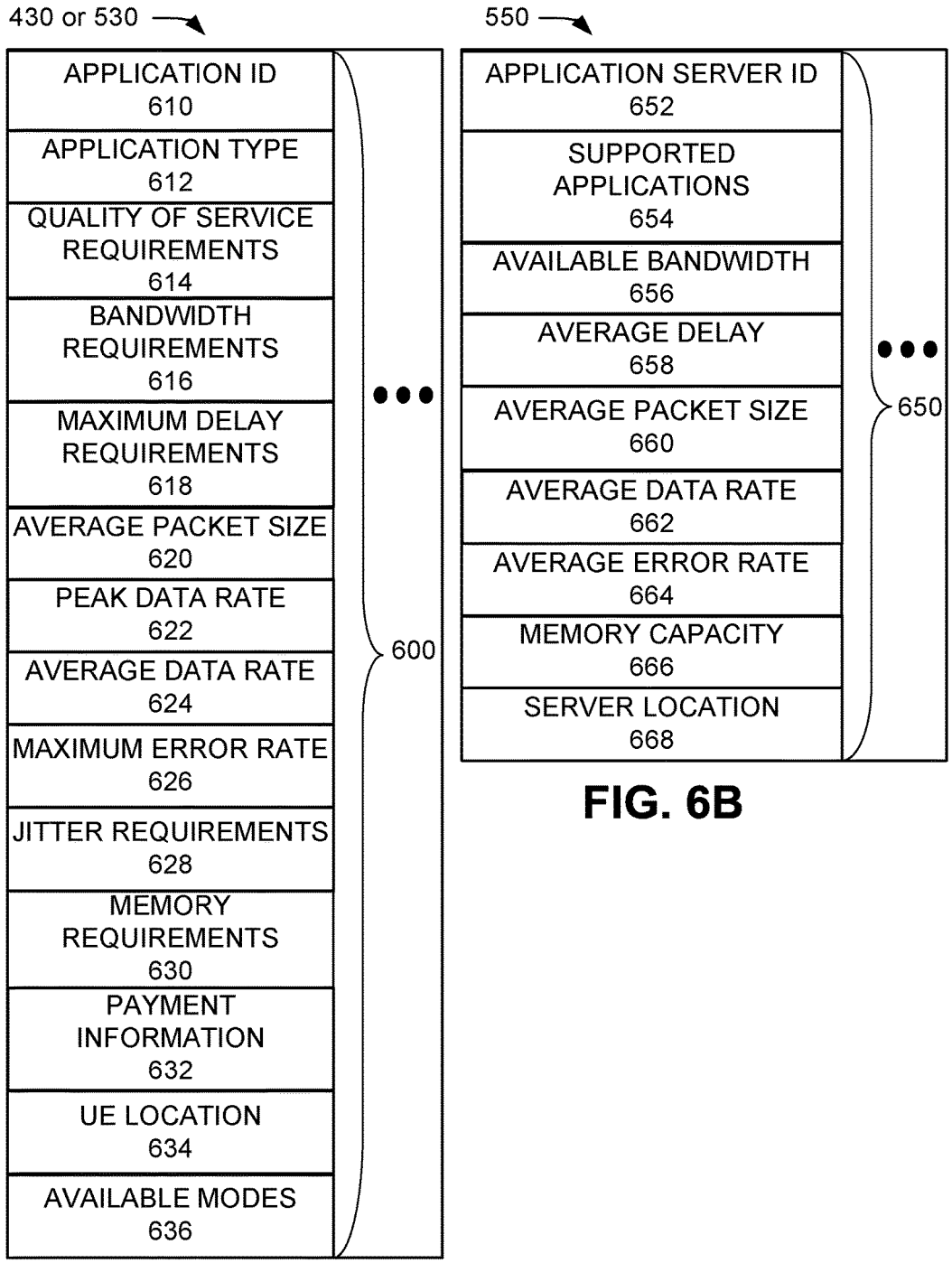
FIG. 6A is a diagram of example fields that may be stored in an application database according to an implementation described herein.
FIG. 6B is a diagram of example fields that may be stored in an application server database according to an implementation described herein.

FIG. 6A is a diagram of example fields that may be stored in application database 430 or 530 according to an implementation described herein. In one implementation, application database 430 may be implemented in a storage device included as part of memory 220 and application database 530 may be implemented in a storage device included as part of memory 330. In another implementation, application database 430 may be stored in a memory associated with another device or a group of devices, separate from or including memory 220, and application database 530 may be stored in a memory associated with another device or a group of devices, separate from or including memory 330.

As shown in FIG. 6A, application database 430 or 530 may include one or more application records 600 (referred to herein collectively as "application records 600" and individually as "application record 600"). Application record 600 may include an application identification (ID) field 610, an application type field 612, a quality of service (QoS) requirements field 614, a bandwidth requirements field 616, a maximum delay requirements field 618, an average packet size field 620, a peak data rate field 622, an average data rate field 624, a maximum error rate field 626, a jitter requirements field 628, a memory requirements field 630, a payment information field 632, a UE location field 634, and available modes field 636.

In one example, some or all of the fields of application record 600 may be populated by application manager 420 and/or by server selection mechanism 520. In another example, some or all of the fields of application record 600 may be populated manually by an administrator. In yet another example, some or all of the fields of application record 600 may be manually adjustable by a user of UE 110. In yet another example, some or all of the fields of application record 600 may be populated using another technique (e.g., by another device associated with UE 110, access network 120, and/or IP network 130).

Particular fields of application record 600 may be associated with a weight (not shown in FIG. 6A). The associated weight may indicate a relative importance of a particular requirement associated with application 405 and may be used in a computation when comparing application requirements to conditions associated with application servers 150 and when selecting a particular application server 150. Additionally or alternatively, application record 600 may include specifications (not shown in FIG. 6A) relating to how values stored in particular fields of application record 600 are to be combined when comparing application requirements to conditions associated with application servers 150 and when selecting a particular application server 150.

Application ID field 610 may store an identifier that uniquely identifies a particular application 405. The identifier may identify application 405 as well as UE 110. Application type field 612 may store information about a type of application associated with application 405. For example, application type field 612 may store information about whether application 405 is associated with a particular category of application, such as, for example, a category that should be given a priority (e.g., an application associated with emergency medical services, an application associated with law enforcement, etc.)

QoS requirements field 614 may store information about particular QoS requirements (e.g., QoS class identifier) associated with application 405. For example, QoS requirements field 614 may identify application 405 as being associated with voice data, real-time video data, real-time gaming data, premium Internet data, best effort Internet data, or another type of data.

Bandwidth requirements field 616 may store information about bandwidth requirements associated with application 405, such as, for example, a minimum bandwidth required for proper exchange of data between application 405 and IP network 130 and/or application server 150. Maximum delay requirements field 618 may store information about a maximum allowable delay for information sent and/or received by application 405 that must be maintained in order for application 405 to function properly or within a particular measure of merit of performance.

Average packet size field 620 may store information about an average packet size of packets sent and/or received by application 405. Peak data rate field 622 may store information about a peak data rate (e.g., bit rate) associated with application 405. Average data rate field 624 may store information about an average data rate (e.g., bit rate) associated with application 405.

Maximum error rate field 626 may store information about a maximum allowable error rate associated with application 405 that must be maintained in order for application 405 to function properly or within a particular measure of merit of performance.

Jitter requirements field 628 may store information indicating a maximum allowable jitter associated with application 405 that must be maintained in order for application 405 to function properly or within a particular measure of merit of performance.

Memory requirements field 630 may store information about memory requirements associated with application 405, such as, for example, memory requirements associated with application server 150 when application server 150 is performing cloud computing on behalf of application 405.

Payment information field 632 may store information about payment information associated with application 405. For example, payment information field 632 may store information about whether a subscription associated with UE 110 includes a subscription for a particular level of service with respect to application 405. For example, a user of UE 110 may have paid for a higher data rate with respect to application 405. UE location field 634 may store a current, or a last identified, location of UE 110.

Available modes field 636 may store information about modes in which application 405 may be run. For example, available modes field 636 may store information that application 405 may be run in a full mode (e.g., with full functionality), may be run in a partial mode (e.g., with some functions enabled and some functions disabled), and/or may be run in a fast mode (e.g., with minimized use of network bandwidth). A particular mode indicated in available modes field 636 may be associated with information about particular requirements associated with the particular mode. For example, a partial mode and/or a fast mode may be associated with particular requirements corresponding to any of the requirements stored in fields 614 to 630. Additionally or alternatively, available modes field 636 may include an enhanced mode. An enhanced mode may indicate that application 405 may utilize additional resources of application server 150 and/or access network 120 or IP network 130 and may be employed when conditions associated with application servers 150 are particularly favorable (e.g., a value of a particular one or more of the conditions associated with application servers 150 is less than a threshold).

Additionally or alternatively, fields 614 to 630 may store multiple values, where each of the multiple values corresponds to one of the available modes. Thus, for example, bandwidth requirements field 616 may store a first bandwidth requirement value associated with a full mode, a second bandwidth requirement value associated with a partial mode, and a third bandwidth requirement value associated with a fast mode.

Although FIG. 6A shows example fields that may be stored in application database 430 or 530, in other implementations, application database 430 or 530 may include fewer fields, different fields, differently arranged fields, and/or additional fields than depicted in FIG. 6A. For example, not all fields of application record 600 need to store values for a particular application 405. For example, a first application 405-X may correspond to a real-time video application that includes QoS, bandwidth, maximum delay, and jitter requirements, while a second application 405-Y may correspond to a data application with high computing requirements that includes a maximum error rate and memory requirements.

FIG. 6B is a diagram of example fields that may be stored in server database 550 according to an implementation described herein. In one implementation, server database 550 may be implemented in a storage device included as part of memory 330. In another implementation, server database 550 may be stored in a memory associated with another device or a group of devices, separate from or including memory 330.

As shown in FIG. 6B, server database 550 may include one or more server records 650 (referred to herein collectively as "server records 650" and individually as "server record 650"). Server record 650 may include application server ID field 652, a supported applications field 654, an available bandwidth field 656, an average delay field 658, an average packet size field 660, an average data rate field 662, an average error rate field 664, a memory capacity field 666, and a server location field 668.

In one example, some or all of the fields of server record 650 may be populated by server selection mechanism 520 at particular intervals. For example, application server 150 may provide information about conditions associated with application server 150 to resource information server 140 at particular intervals. In another example, some or all of the fields of server record 650 may be populated manually by an administrator. In yet another example, some or all of the fields of server record 650 may be populated using another technique (e.g., another device associated with UE 110, access network 120, and/or IP network 130).

Application server ID field 652 may store an identifier that uniquely identifies a particular application server 150. The identifier may correspond to a network address, such as an IP address, and/or another type of unique identifier.

Supported applications field 654 may store information about applications 405 that application server 150 supports. For example, some application servers 150 may not support particular applications 405.

Available bandwidth field 656 may store information about a currently available bandwidth associated with application server 150. Average delay field 658 may store information about an average delay associated with application server 150. Average packet size field 660 may store information about an average packet size associated with application server 150. Average data rate field 662 may store information about an average data rate (e.g., bit rate) associated with application server 150. Average error rate field 664 may store information about an average error rate associated with application server 150. Memory capacity field 666 may store information about a current memory capacity associated with application server 150. Server location field 668 may store information about a location of application server 150.

Although FIG. 6B shows example fields that may be stored in server database 550, in other implementations, server database 550 may include fewer fields, different fields, differently arranged fields, and/or additional fields than depicted in FIG. 6B.

Figure 7:
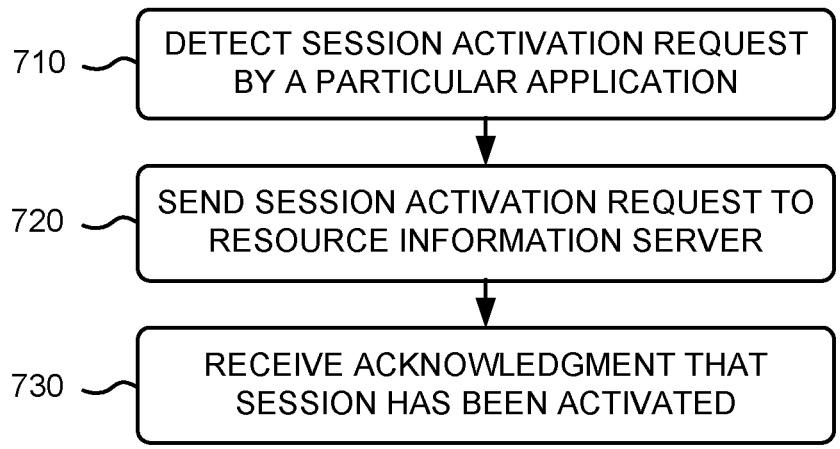
FIG. 7 is a flow diagram illustrating a first process for providing a session activation request according to an implementation described herein.
Figure 8:
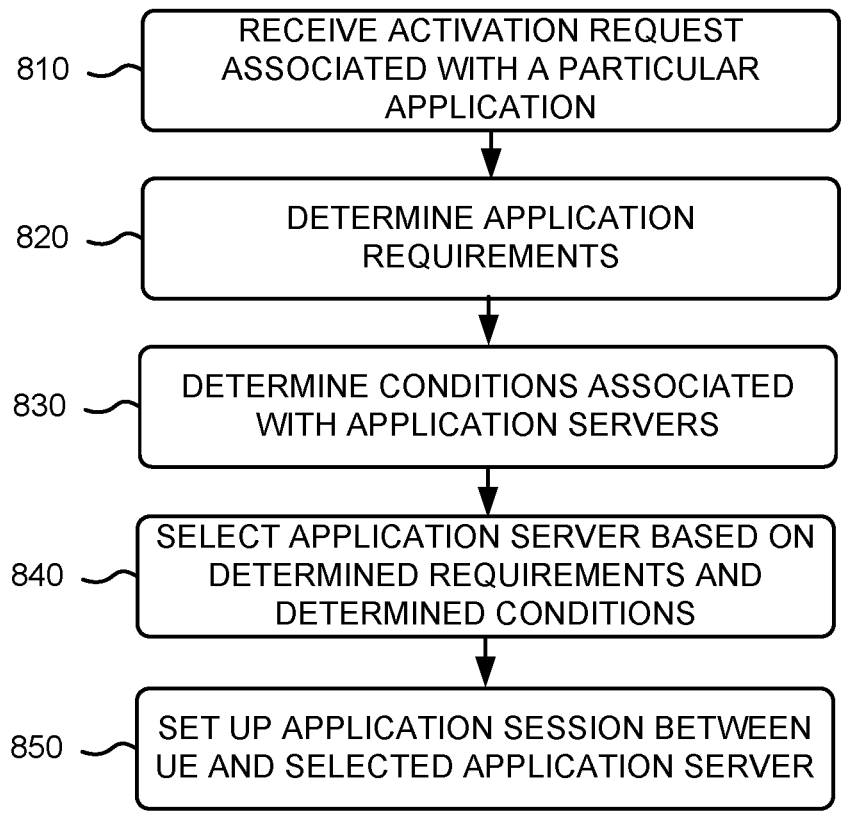
FIG. 8 is a flow diagram illustrating a first process for selecting an application server according an implementation described herein.

FIGS. 7 and 8 describe processes relating to an implementation where resource information server 140 stores requirements associated with UE applications. FIG. 7 is a flow diagram illustrating a first process for providing a session activation request according to an implementation described herein. In one implementation, the process of FIG. 7 may be performed by UE 110. In other implementations, some or all of the process of FIG. 7 may be performed by another device or a group of devices separate from and/or possibly remote from UE 110 and/or including UE 110.

The process of FIG. 7 may include detecting a session activation request by a particular application (block 710). For example, application manager 420 may detect a session activation request from a particular application 405. The session activation request may be sent to the resource information server (block 720). For example, server interface 440 may forward the session activation request to resource information server 140.

An acknowledgement may be received that the session has been activated (block 730). For example, application manager 420 may receive, via server interface 440, an acknowledgement that a session has been initiated with a particular application server 150. The acknowledgement may include information identifying the particular application server 150. In one example, the acknowledgement may include an instruction about a particular application mode that is to be selected by application manager 420. In response to receiving the acknowledgement, application manager 420 may instruct application 405 to communicate with the particular application server 150 using the selected application mode.

FIG. 8 is a flow diagram illustrating a first process for selecting an application server according an implementation described herein. In one implementation, the process of FIG. 8 may be performed by resource information server 140. In other implementations, some or all of the process of FIG. 8 may be performed by another device or a group of devices separate from and/or possibly remote from resource information server 140 and/or including resource information server 140.

The process of FIG. 8 may include receiving an activation request associated with a particular application (block 810). For example, UE interface 510 may receive a request from UE 110 on behalf of application 405, requesting an application session with one of application servers 150. The request may include information identifying application 405, such as, for example, an identifier corresponding to the identifier stored in application ID field 552 of application database 530.

Application requirements may be determined (block 820). For example, server selection mechanism 520 may identify application 405 based on the received information and may access application database 530 to identify application requirements stored in application record 600 associated with the identified application 405.

Conditions associated with application servers may be determined (block 830). For example, server selection mechanism 520 may access server application database 550 to determine conditions associated with application servers 150. Additionally or alternatively, server mechanism 520 may query application servers 150 to determine conditions associated with application servers 150.

An application server may be selected based on the determined application requirements and based on the determined application server conditions (block 840). For example, server selection mechanism 520 may compare the determined application requirements with the determined application server conditions to identify a particular application server 150 that best matches the application requirements. In one example, server selection mechanism 520 may select particular application requirements that apply to application 405 (e.g., application requirements associated with stored values in application database 530) and may compare the particular application requirements to corresponding conditions associated with particular application servers 150.

For example, an application type associated with application 405 may be compared with supported applications associated with application server 150; a bandwidth requirement associated with application 405 may be compared to an available bandwidth associated with application server 150; a maximum delay requirement associated with application 405 may be compared with an average delay associated with application server 150; an average packet size associated with application 405 may be compared with an average packet size associated with application server 150; a peak data rate and/or an average data rate associated with application 405 may be compared with an average data rate associated with application server 150; a maximum error rate associated with application 405 may be compared with an average error rate associated with application server 150; memory requirements associated with application 405 may be compared with memory capacity associated with application server 150; and/or a UE location associated with application 405 may be compared with a server location associated with application server 150.

A particular application requirement may be compared to a value of a corresponding condition associated with a particular application server 150 to generate a difference between the particular application requirement and the value of the corresponding condition. The differences associated with particular application requirements and the values of the corresponding conditions for the particular application server 150 may be combined to generate a score for the particular application server 150. A score for the particular application server 150 may be generated using any applicable technique.

In one example, each application requirement may be associated with a particular weight, the corresponding generated difference may be multiplied with the particular weight, and the multiplied differences may be added to generate a weighted sum corresponding to the score. A quantified difference may not be applicable to some application requirements. For example, comparing an application type associated with application 405 to supported applications associated with application server 150 or determining whether application server 150 can satisfy a QoS requirement may generate a binary result (e.g., a 'yes' or 'no' result or a binary '1' or '0' result). In the example of a weighted sum, such results may be excluded from the weighted sum calculation.

The scores may be used to rank application servers 150 and the particular application server 150 associated with a lowest (or highest) score, compared to the scores associated with other application servers 150, may be selected for the application session. For example, the particular application server 150 with the smallest combined difference between the conditions associated with the particular application server 150 and the application requirements may be selected.

In one example, more than one application server 150 may be selected. For example, server selection mechanism 520 may select a particular number of application servers 150 with the best matches (e.g., the top X application servers) and may load balance cloud computing associated with application 405 across the selected application servers 150.

Additionally or alternatively to computing a weighted sum, particular application requirements may be used to disqualify a particular application server 150 from being selected. For example, if a particular application server 150 does not satisfy QoS requirements associated with application 405, the particular application server 150 may be disqualified from being selected. As another example, if a particular application server 150 does not support an application type associated with application 405, the particular application server 150 may be disqualified from being selected. As yet another example, if a particular application server 150 is associated with an average delay requirement that exceeds the maximum allowable delay requirement associated with application 405, the particular application server 150 may be disqualified from being selected. Any particular application requirement may be designated as a necessary condition (e.g., a particular application server 150 must satisfy the requirement or be automatically disqualified from being selected).

In one example, if no particular application server 150 can be identified that satisfies the necessary requirements associated with application 405, server selection mechanism 520 may determine that application 405 needs to be run in a reduced mode. For example, server selection mechanism 520 may determine that application 405 needs to be run in a partial mode, with some functions disabled, or in a fast mode, using minimized bandwidth. The closest matching application server 150 may then be determined based on the requirements associated with a partial mode or a fast mode.

An application session may be set up between the UE and the selected application server (block 850). For example, server interface 570 may send a request to set up an application session to the selected application server 150 on behalf of UE 110 (e.g., by providing an IP address, associated with UE 110, and an application ID, associated with application 405, to the selection application server 150). The request may include an instruction to run application 405 in a particular mode (e.g., a partial mode or a fast mode).

Server interface 570 may wait for a response from application server 150 to confirm that a session was successfully initiated for application 405. Once a session was successfully initiated, application server 150 may continue to communicate with application 405 by communicating with UE 110. If server interface 570 does not receive a response from the selected application server 150 within a particular time period, server selection mechanism 520 may select another application server 150.

In another example, server interface 570 may not send a request to the selected application server 150. Rather, UE interface 510 may send information about the selected application server 150 (e.g., an IP address associated with the selected application server 150) to UE 110 with instructions for UE 110 to contact application server 150.

In yet another example, both application server 150 and UE 110 may be contacted by resource information server 140. For example, server interface 570 may send a request to initiate an application session to the selected application server 150 and UE interface 510 may send information about the selected application server 150 to UE 110.

Figure 9:
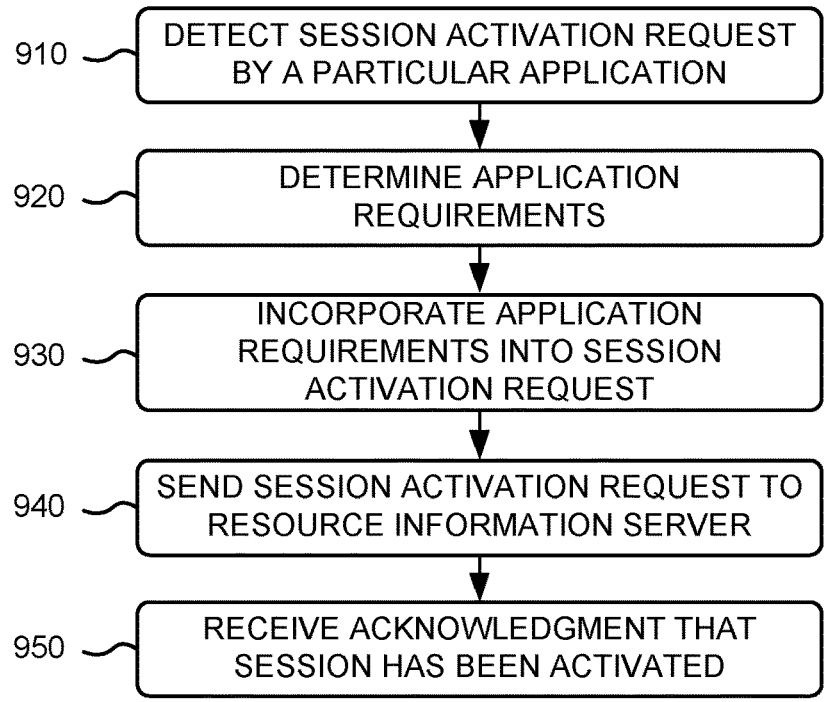
FIG. 9 is a flow diagram illustrating a second process for providing a session activation request according to an implementation described herein.
Figure 10:
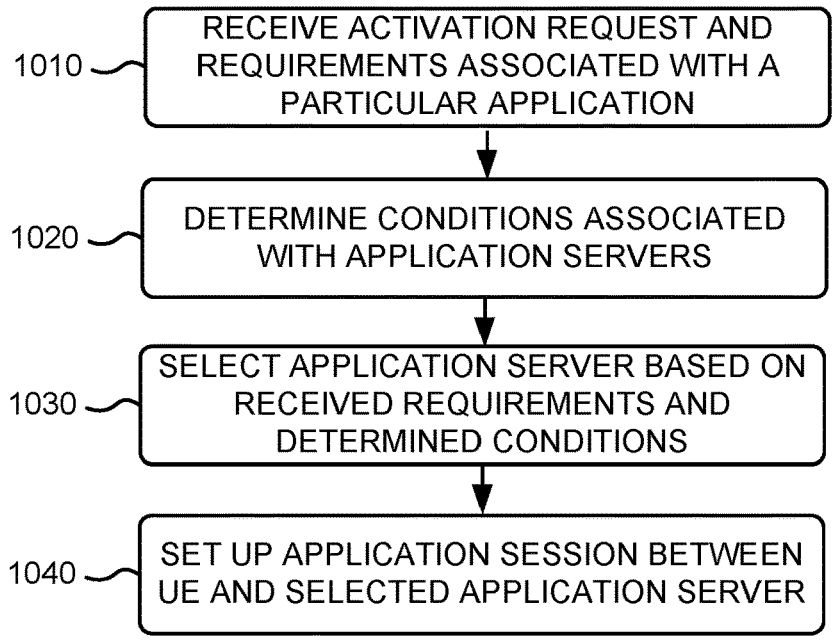
FIG. 10 is a flow diagram illustrating a second process for selecting an application server according an implementation described herein.

FIGS. 9 and 10 describe processes relating to an implementation where UE 110 stores requirements associated with UE applications. In one implementation, the process of FIG. 9 may be performed by UE 110. In other implementations, some or all of the process of FIG. 9 may be performed by another device or a group of devices separate from and/or possibly remote from UE 110 and/or including UE 110.

The process of FIG. 9 may include detecting a session activation request by a particular application (block 910). For example, application manager 420 may detect a session activation request from a particular application 405. Application requirements may be determined (block 920). For example, application manager 420 may identify application 405 based on the detected session activation request and may access application database 430 to identify application requirements stored in application record 600 associated with the identified application 405.

The application requirements may be incorporated into the session activation request (block 930). For example, application manager 420 may incorporate information from application record 600, associated with application 405, into the session activation request. The session activation request may be sent to the resource information server (block 940). For example, server interface 440 may forward the session activation request to resource information server 140.

An acknowledgement may be received that the session has been activated (block 950). For example, application manager 420 may receive, via server interface 440, an acknowledgement that a session has been initiated with a particular application server 150. The acknowledgement may include information identifying the particular application server 150. In one example, the acknowledgement may include an instruction about a particular application mode that is to be selected by application manager 420. In response to receiving the acknowledgement, application manager 420 may instruct application 405 to communicate with the particular application server 150 using the selected application mode.

FIG. 10 is a flow diagram illustrating a second process for selecting an application server according an implementation described herein. In one implementation, the process of FIG. 10 may be performed by resource information server 140. In other implementations, some or all of the process of FIG. 10 may be performed by another device or a group of devices separate from and/or possibly remote from resource information server 140 and/or including resource information server 140.

The process of FIG. 10 may include receiving an activation request and requirements associated with a particular application (block 1010). For example, UE interface 510 may receive a request from UE 110 on behalf of application 405, requesting an application session with one of application servers 150. The request may include information identifying application 405, such as, for example, an identifier corresponding to the identifier stored in application ID field 552 of application database 530. The request may further include requirements associated with application 405 based on information stored in application database 430 of UE 110.

Conditions associated with application servers may be determined (block 1020). For example, server selection mechanism 520 may access server database 550 to determine conditions associated with application servers 150. Additionally or alternatively, server mechanism 520 may query application servers 150 to determine conditions associated with application servers 150.

An application server may be selected based on the received application requirements and based on the determined conditions associated with the application servers (block 1030). For example, server selection mechanism 520 may compare the received application requirements with the determined application server conditions to identify a particular application server 150 that best matches the application requirements.

For example, a received application type associated with application 405 may be compared with determined supported applications associated with application server 150; a received bandwidth requirement associated with application 405 may be compared to determined available bandwidth associated with application server 150; a received maximum delay requirement associated with application 405 may be compared with a determined average delay associated with application server 150; a received average packet size associated with application 405 may be compared with a determined average packet size associated with application server 150; a received peak data rate and/or a received average data rate associated with application 405 may be compared with a determined average data rate associated with application server 150; a received maximum error rate associated with application 405 may be compared with a determined average error rate associated with application server 150; received memory requirements associated with application 405 may be compared with determined memory capacity associated with application server 150; and/or a received UE location associated with application 405 may be compared with a determined server location associated with application server 150. A particular application server 150 may then be selected similarly to the process explained above with reference to block 840 of FIG. 8.

An application session may be set up between the UE and the selected application server (block 1040). For example, server interface 570 may send a request to set up an application session to the selected application server 150 on behalf of UE 110 (e.g., by providing an IP address, associated with UE 110, and an application ID, associated with application 405, to the selection application server 150). The request may include an instruction to run application 405 in a particular mode (e.g., a partial mode or a fast mode).

Server interface 570 may wait for a response from application server 150 to confirm that a session was successfully initiated for application 405. Once a session was successfully initiated, application server 150 may continue to communicate with application 405 by communicating with UE 110. If server interface 570 does not receive a response from the selected application server 150 within a particular time period, server selection mechanism 520 may select another application server 150.

In another example, server interface 570 may not send a request to the selected application server 150. Rather, UE interface 510 may send information about the selected application server 150 (e.g., an IP address associated with the selected application server 150) to UE 110 with instructions for UE 110 to contact application server 150.

In yet another example, both application server 150 and UE 110 may be contacted by resource information server 140. For example, server interface 570 may send a request to initiate an application session to the selected application server 150 and UE interface 510 may send information about the selected application server 150 to UE 110.

Figure 11:
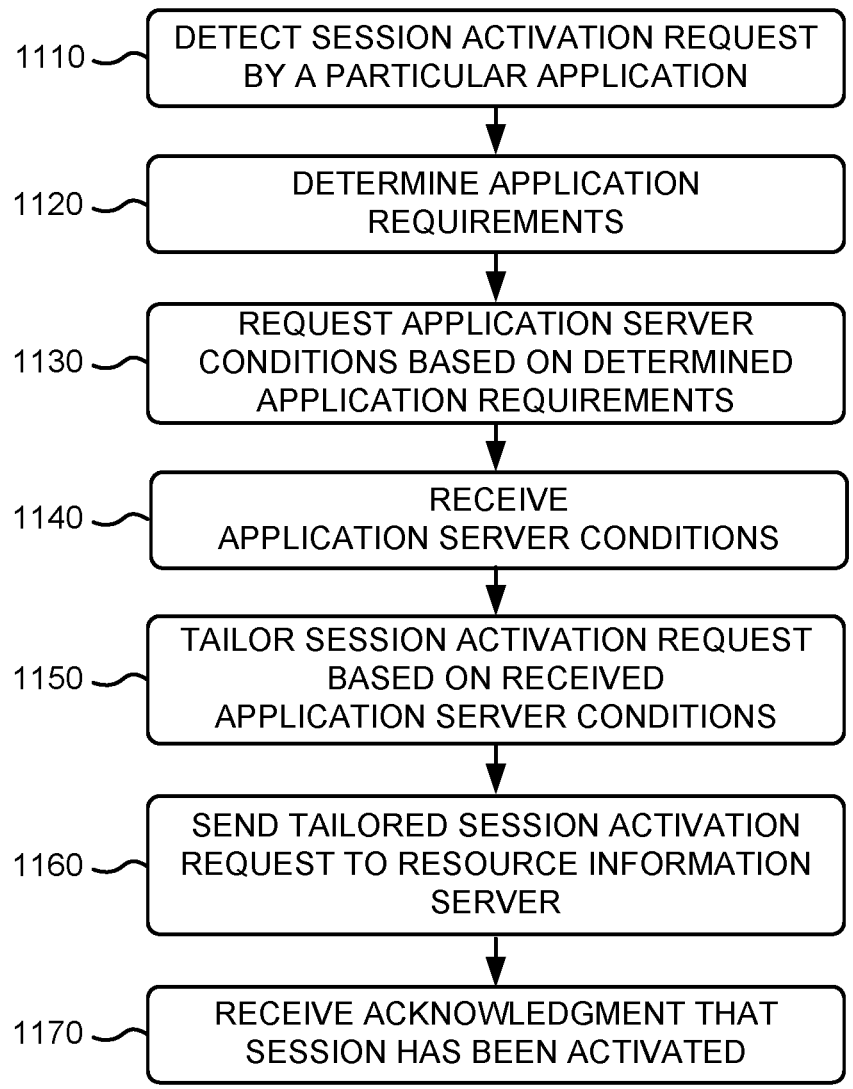
FIG. 11 is a flow diagram illustrating a third process for providing a session activation request according to an implementation described herein.
Figure 12:
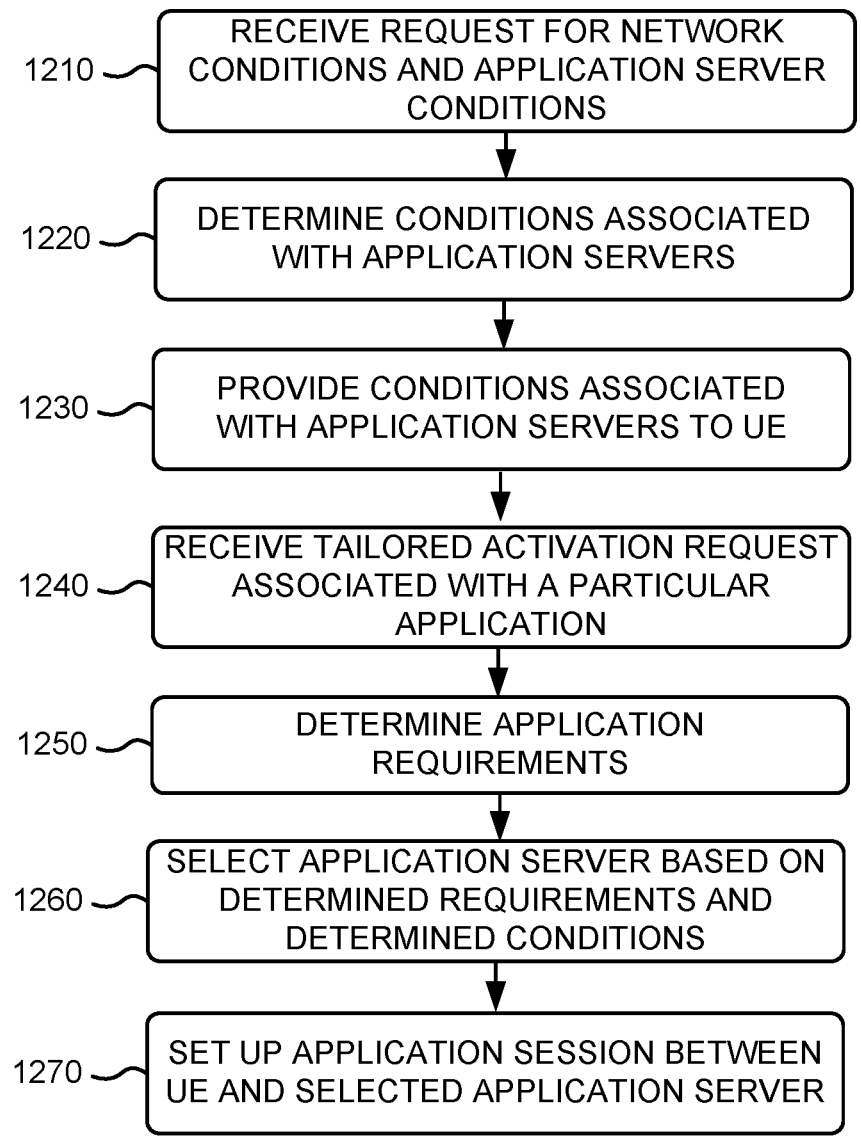
FIG. 12 is a flow diagram illustrating a third process for selecting an application server according an implementation described herein.

FIGS. 11 and 12 describe processes relating to an implementation where UE 110 and resource information server 140 negotiate with respect to application requirements associated with UE applications. In one implementation, the process of FIG. 11 may be performed by UE 110. In other implementations, some or all of the process of FIG. 11 may be performed by another device or a group of devices separate from and/or possibly remote from UE 110 and/or including UE 110.

The process of FIG. 11 may include detecting a session activation request by a particular application (block 1110). For example, application manager 420 may detect a session activation request from a particular application 405. Application requirements may be determined (block 1120). For example, application manager 420 may identify application 405 based on the detected session activation request and may access application database 430 to identify application requirements stored in application record 600 associated with the identified application 405. Application manager 420 may select particular application requirements that are relevant to application 405 (e.g., the application requirements that have an associated value stored in application record 600).

Application server conditions may be requested based on the determined application requirements (block 1130). For example, application manager 420 may send a request to resource information server 140 to provide conditions associated with the relevant application requirements. Resource application server 140 may, in response to receiving the request, determine a particular application server 150 associated with conditions that best match the application requirements. Application server conditions may be received (block 1140). For example, server interface 440 may receive information from resource information server 140 about conditions associated with one or more particular application servers 150.

A session activation request may be tailored based on the received application server conditions (block 1150). For example, application manager 420 may adjust a session activation request based on the received conditions associated with the one or more application servers 150. In one example, application manager 420 may select a particular application mode from a set of available modes stored in available modes field 636 of application record 600 associated with application 405. For example, application manager 420 may determine that a full mode may not be available based on no application server 150 satisfying necessary requirements associated with a full mode of application 405. Application manager 420 may select a particular reduced mode of application 405 by comparing the received information about the application server conditions with requirements associated with particular ones of the reduced modes (e.g., by comparing the received information about the conditions to information stored in available modes 636 of application record associated with application 405 and/or by comparing the received information about the conditions to values stored in fields 614 to 630 in association with a particular reduced mode).

The tailored session activation request may be sent to the resource information server (block 1160). For example, server interface 440 may forward the tailored session activation request, along with information about the selected application mode, to resource information server 140. An acknowledgement may be received that the session has been activated (block 1170). For example, application manager 420 may receive, via server interface 440, an acknowledgement that a session has been initiated with a particular application server 150. The acknowledgement may include information identifying the particular application server 150. In response to receiving the acknowledgement, application manager 420 may instruct application 405 to communicate with the particular application server 150.

FIG. 12 is a flow diagram illustrating a third process for selecting an application server according an implementation described herein. In one implementation, the process of FIG. 12 may be performed by resource information server 140. In other implementations, some or all of the process of FIG. 12 may be performed by another device or a group of devices separate from and/or possibly remote from resource information server 140 and/or including resource information server 140.

The process of FIG. 12 may include receiving an activation request associated with a particular application (block 1210). For example, UE interface 510 may receive a request from UE 110 on behalf of application 405, requesting conditions associated with application servers 150. The request may include information identifying particular application requirements that are relevant to application 405.

Conditions associated with application servers may be determined (block 1220). For example, server selection mechanism 520 may access server application database 540 to determine conditions associated with application servers 150. Additionally or alternatively, server mechanism 520 may query application servers 150 to determine conditions associated with application servers 150. Server selection mechanism 520 may select information about particular conditions, associated with application servers 150, which correspond to the identified relevant application requirements.

The conditions associated with the application servers may be provided to the UE (block 1230). For example, UE interface 510 may send the selected information about particular conditions, associated with application servers 150, which correspond to the identified relevant application requirements to UE 110.

A tailored activation requested may be received associated with the particular application (block 1240). For example, UE interface 510 may receive a request on behalf of application 405, requesting an application session with one of application servers 150. The request may include information identifying application 405, such as, for example, an identifier corresponding to the identifier stored in application ID field 552 of application database 530. The request may further include requirements associated with application 405 based on information stored in application database 430 of UE 110. The request may further include information indicating a particular mode that was selected for application 405 based on the provided information about the conditions associated with application servers 150. For example, the particular mode may correspond to a reduced mode, such as a partial mode or a fast mode for application 405.

Application requirements may be determined (block 1250). For example, server selection mechanism 520 may identify application 405 based on the received information and may access application database 530 to identify application requirements stored in application record 600 associated with the identified application 405. Additionally or alternatively, information about application requirements may be received from UE 110 along with the tailored activation request.

An application server may be selected based on the received application requirements and based on the determined conditions associated with the application servers (block 1260). For example, server selection mechanism 520 may compare the determined application requirements with the determined application server conditions to identify a particular application server 150 that best matches the application requirements. A particular application server 150 may then be selected similarly to the process explained above with reference to block 840 of FIG. 8.

An application session may be set up between the UE and the selected application server (block 1270). For example, server interface 570 may send a request to set up an application session to the selected application server 150 on behalf of UE 110 (e.g., by providing an IP address, associated with UE 110, and an application ID, associated with application 405, to the selection application server 150). Server interface 570 may wait for a response from application server 150 to confirm that a session was successfully initiated for application 405. Once a session was successfully initiated, application server 150 may continue to communicate with application 405 by communicating with UE 110. If server interface 570 does not receive a response from the selected application server 150 within a particular time period, server selection mechanism 520 may select another application server 150.

In another example, server interface 570 may not send a request to the selected application server 150. Rather, UE interface 510 may send information about the selected application server 150 (e.g., an IP address associated with the selected application server 150) to UE 110 with instructions for UE 110 to contact application server 150.

In yet another example, both application server 150 and UE 110 may be contacted by resource information server 140. For example, server interface 570 may send a request to initiate an application session to the selected application server 150 and UE interface 510 may send information about the selected application server 150 to UE 110.

The foregoing description of implementations, described above, provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-12, the order of the blocks may be modified in other implementations. Further, non-dependent blocks may be performed in parallel.

Also, certain portions of the implementations may have been described as a "component," "manager," "interface," or "mechanism" that perform one or more functions. The terms "component," "manager," "interface," and "mechanism" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    detecting, by a mobile communication device, a session activation request to perform cloud computing for an application installed on the mobile communication device;
    requesting, by the mobile communication device and from a resource information device, conditions information relating to processing capacity conditions associated with a plurality of application servers, wherein the plurality of application servers are configured to perform cloud computing for the application;
    receiving, by the mobile communication device and from the resource information device, the requested conditions information;
    selecting, by the mobile communication device, an application mode for the application from a plurality of available modes for the application identified in an application database stored on the mobile communication device, based on the received conditions information, wherein selecting the application mode for the application based on the received conditions information includes:
    determining that the processing capacity conditions are associated with a value that is less than a threshold; and
    selecting, by the mobile communication device, an enhanced mode for the application from a plurality of available modes for the application identified in an application database stored on the mobile communication device, in response to determining that the processing capacity conditions are associated with the value that is less than the threshold, wherein the enhanced mode uses additional resources, associated with the plurality of application servers in comparison with a full mode of the application;
    tailoring, by the mobile communication device, the session activation request based on the selected application mode, wherein the tailored session activation request includes information identifying the selected application mode;
    sending, by the mobile communication device and across a network, the tailored session activation request, to perform the cloud computing for the application installed on the mobile communication device, to the resource information device;
    receiving, from the resource information device, information identifying a selected application server, of the plurality of application servers, for the tailored session activation request; and
    sending a request to the selected application server to set up an application session for the application in the selected application mode and to perform the cloud computing for the application session.

2. The method of claim 1, further comprising:
    determining application requirements associated with the application; and
    providing the determined application requirements to the resource information device.

3. The method of claim 2, wherein the application requirements include two or more of:
    an application type associated with the application,
    a bandwidth requirement associated with the application,
    a maximum delay requirement associated with the application,
    an average delay associated with the application,
    an average packet size associated with the application,
    a peak data rate associated with the application,
    an average data rate associated with the application,
    a maximum error rate associated with the application,
    a memory requirement associated with the application, or
    a location associated with the mobile communication device.

4. The method of claim 1, wherein the received conditions information includes two or more of:
    supported applications associated with a particular one of the plurality of application servers,
    an available bandwidth associated with the particular one of the plurality of application servers,
    an average delay associated with the particular one of the plurality of application servers,
    an average packet size associated with the particular one of the plurality of application servers,
    an average data rate associated with the particular one of the plurality of application servers,
    an average error rate associated with the particular one of the plurality of application servers,
    a memory capacity associated with the particular one of the plurality of application servers, or
    a server location associated with the particular one of the plurality of application servers.

5. A mobile communication device comprising:
    a memory to store instructions; and
    a processor configured to execute the instructions to:
    detect a session activation request to perform cloud computing for an application installed on the mobile communication device;
    request, from a resource information device, conditions information relating to processing capacity conditions associated with a plurality of application servers, wherein the plurality of application servers are configured to perform cloud computing for the application;
    receive, from the resource information device, the requested conditions information;
    select an application mode for the application from a plurality of available modes for the application identified in an application database stored on the mobile communication device, based on the received conditions information;
    select an application mode for the application from a plurality of available modes for the application identified in an application database stored on the mobile communication device, based on the received conditions information, wherein when selecting the application mode for the application based on the received conditions information, the processor is further configured to:
    determine that the processing capacity conditions are associated with a value that is less than a threshold; and
    select an enhanced mode for the application from a plurality of available modes for the application identified in an application database stored on the mobile communication device, in response to determining that the processing capacity conditions are associated with the value that is less than the threshold, wherein the enhanced mode uses additional resources, associated with the plurality of application servers in comparison with a full mode of the application;
    tailor the session activation request based on the selected application mode, wherein the tailored session activation request includes information identifying the selected application mode; and send, across a network, the tailored session activation request, to perform the cloud computing for the application installed on the mobile communication device, to the resource information device;

receive, from the resource information device, information identifying a selected application server, of the plurality of application servers, for the tailored session activation request; and send a request to the selected application server to set up an application session for the application in the selected application mode and to perform the cloud computing for the application session.

6. The mobile communication device of claim 5, wherein the processor is further configured to:

determine application requirements associated with the application; and provide the determined application requirements to the resource information device.

7. The mobile communication device of claim 6, wherein the application requirements include two or more of:

an application type associated with the application,
a bandwidth requirement associated with the application,
a maximum delay requirement associated with the application,
an average delay associated with the application,
an average packet size associated with the application,
a peak data rate associated with the application,
an average data rate associated with the application,
a maximum error rate associated with the application,
a memory requirement associated with the application, or
a location associated with the mobile communication device.

8. The mobile communication device of claim 5, wherein the received conditions information includes two or more of:

supported applications associated with a particular one of the plurality of application servers,
an available bandwidth associated with the particular one of the plurality of application servers,
an average delay associated with the particular one of the plurality of application servers,
an average packet size associated with the particular one of the plurality of application servers,
an average data rate associated with the particular one of the plurality of application servers,
an average error rate associated with the particular one of the plurality of application servers,
a memory capacity associated with the particular one of the plurality of application servers, or
a server location associated with the particular one of the plurality of application servers.

9. A non-transitory computer-readable memory device storing instructions executable by a processor, the non-transitory computer-readable memory device comprising:

one or more instructions to detect a session activation request to perform cloud computing for an application installed on a mobile communication device;

one or more instructions to request, from a resource information device, conditions information relating to network or processing capacity conditions associated with a plurality of application servers, wherein the plurality of application servers are configured to perform cloud computing for the application;

one or more instructions to receive, from the resource information device, the requested conditions information;

one or more instructions to select an application mode for the application from a plurality of available modes for the application identified in an application database stored on the mobile communication device, based on the received conditions information, wherein the one or more instructions to select the application mode for the application based on the received conditions information further include:

one or more instructions to determine that the processing capacity conditions are associated with a value that is less than a threshold; and one or more instructions to select an enhanced mode for the application from a plurality of available modes for the application identified in an application database stored on the mobile communication device, in response to determining that the processing capacity conditions are associated with the value that is less than the threshold, wherein the enhanced mode uses additional resources, associated with the plurality of application servers in comparison with a full mode of the application;

one or more instructions to tailor the session activation request based on the selected application mode, wherein the tailored session activation request includes information identifying the selected application mode; and one or more instructions to send, across a network, the tailored session activation request, to perform the cloud computing for the application installed on the mobile communication device, to the resource information device;

one or more instructions to receive, from the resource information device, information identifying a selected application server, of the plurality of application servers, for the tailored session activation request; and one or more instructions to receive send a request to the selected application server to set up an application session for the application in the selected application mode and to perform the cloud computing for the application session.

* * * * *